April 3, 1928.
R. MEYER
ROTARY ENGINE
Filed Jan. 29, 1923
1,664,987
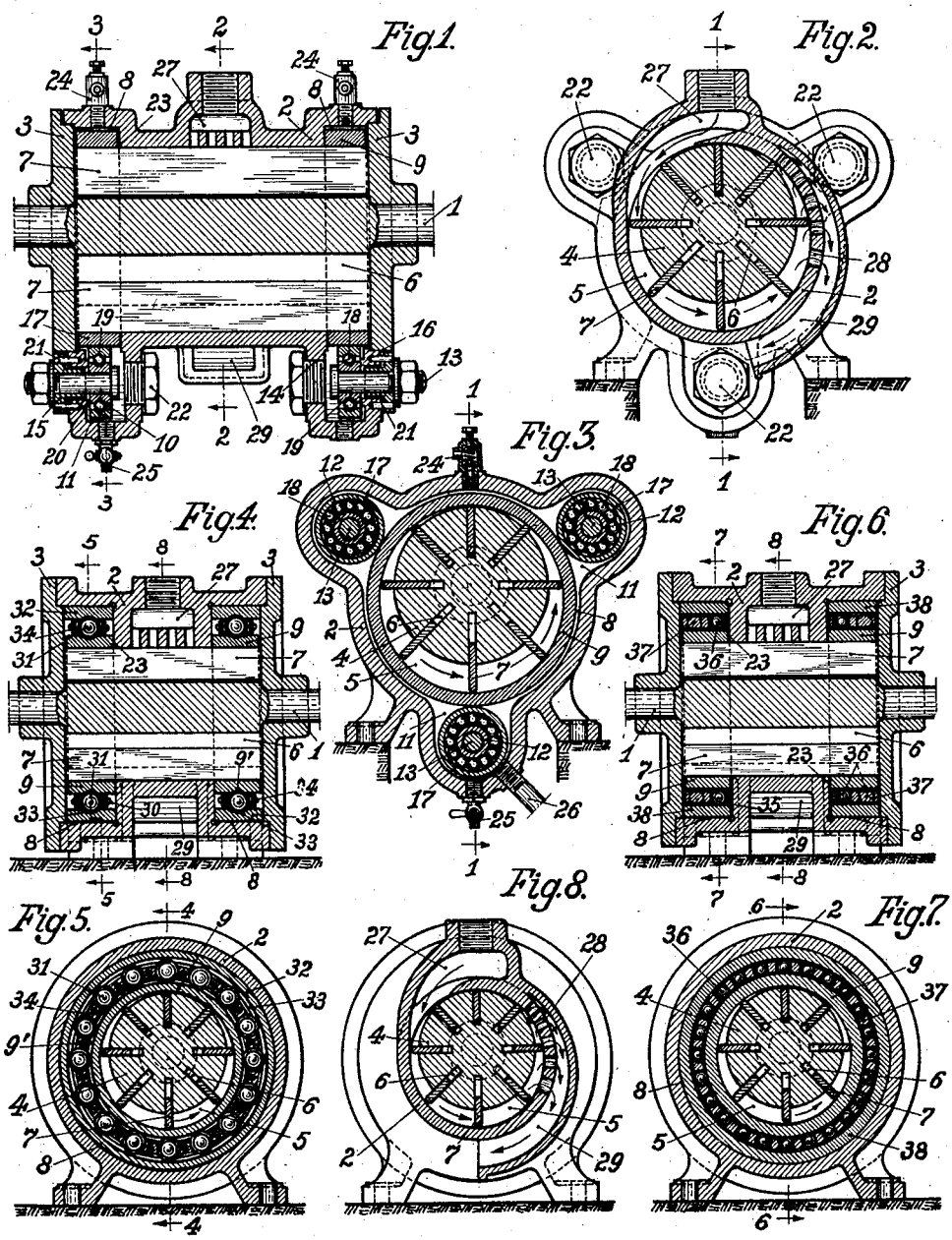
Witnesses:
Daniel Mathé
George Du Bon
Inventor:
Robert Meyer
by Lorka, Kehlenbeck & Mathé
Attorneys.

Patented Apr. 3, 1928.

1,664,987

UNITED STATES PATENT OFFICE.

ROBERT MEYER, OF GELSENKIRCHEN, GERMANY.

ROTARY ENGINE.

Application filed January 29, 1923, Serial No. 615,551, and in Germany January 30, 1922.

For rotary engines with crescent-shaped working chambers and blades arranged in radial slots of the piston different means have been suggested to neutralize the centrifugal force of these blades to prevent the destruction of the true circular bore of the cylinder by unequal wear. To attain this end either the whole cylinder face, or annular parts thereof, are rotatably mounted. But this arrangement renders a good lubrication very difficult if not entirely impossible because these large sliding surfaces do not permit the lubricant to reach all points thereof and lubricate them uniformly.

In accordance with my present invention I support such rotatable parts of the cylinder face, hereinafter for the sake of brevity called "stay-rings", in annular terminal cylinder recesses on anti-friction bearings, such as ball bearings or roller bearings. I arrange these stay-rings rotatably in said annular terminal cylinder recesses with just sufficient lateral play to permit small quantities of the motive fluid to gain admittance to them from the crescent-shaped working chamber, but against the atmosphere I close these recesses hermetically by means of the cylinder casing. In consequence of this arrangement the mean pressure of the motive fluid exerted in the working chamber of the cylinder obtains in these terminal cylinder recesses too. Since the motive fluid carries the lubricant in a most uniformly distributed and atomized condition an uninterrupted and good lubrication of the antifriction bearings and the stay-rings is assured.

These anti-friction bearings may be of any suitable construction. To keep the rotatable stay-rings concentric with the axis of the cylinder it is necessary to support them at least at three points preferably arranged equidistant one from another. When this minimum of bearing points has been fixed upon, the contact between the anti-friction bearings and said stay-rings is very advantageously formed by means of contact rings which with their external face bear against said rotatable stay-rings and with their internal face cooperate with the balls or rollers of suitable ball bearings or roller bearings. These contact rings may, however, be omitted, to which end the rotatable stay-rings themselves are utilized as the inner bearing rings of ball bearings, or roller bearings, of a sufficiently large diameter to encircle said stay-rings, whereas the outer bearing rings of such large anti-friction bearings are immovably secured in said cylinder casing concentrically with the axis of the cylinder. In ball bearings utilized for this purpose the balls thereof may be arranged in one or more rows as circumstances may suggest. Likewise the ball-cages of such anti-friction bearings may be of any shape found suitable in practice.

In the accompanying drawing I have shown by way of example several rotary engines wherein my invention is embodied in various forms. In said drawing:

Figure 1 is a longitudinal sectional view taken on line 1—1 of Figures 2 and 3.

Figure 2 is a transverse sectional view taken on line 2—2 of Figure 1 to illustrate the action of the motive fluid on the rotary piston, Figure 3 is a transverse sectional view taken on line 3—3 of Figure 1 wherein the rotatable stay-rings are sustained at three points by externally arranged anti-friction bearings, Figure 4 is a longitudinal sectional view taken on line 4—4 of Figure 5, Figure 5 is a transverse sectional view taken on line 5—5 of Figure 4 wherein the rotatable stay-rings embody the inner bearing rings of anti-friction bearings larger in diameter than said stay-rings, Figure 6 is a longitudinal sectional view taken on line 6—6 of Figure 7, Figure 7 is a transverse sectional view similar to Figure 5 and taken on line 7—7 of Figure 6 wherein the rotatable stay-rings likewise embody the inner bearing rings of anti-friction bearings larger in diameter than said stay-rings, Figure 8 is a transverse sectional view taken on line 8—8 of Figures 4 and 6 to indicate the passage of the motive fluid through the rotary engines shown in Figures 4 to 7 inclusive, and Figure 9 is a plan-view of a part of a massive cellular cage employed in Figures 6 and 7.

The driving shaft 1 of my improved rotary engine is arranged eccentrically to the axis of the cylinder 2 and is journaled in the cylinder covers 3. On said driving shaft 1 the rotary piston 4 is mounted concentrically, as best shown in Figures 2 and 3, by which arrangment the crescent-shaped working chamber 5 is produced. The piston 4 is provided with radially arranged longitudinal slots 6 for the reception of the working blades 7 adapted to slide therein radially in and out. At the usual high number of revolutions of the piston these blades develop a considerable centrifugal force which increases in the ratio said blades move outward in the radial piston slots. To prevent this centrifugal force from causing one-sided wear of the cylinder face I provide annular terminal cylinder recesses 8 and in each of them I arrange a rotatable stay-ring 9 the internal diameter of which corresponds exactly with the diameter of the cylinder 2. Since these stay-rings are set in motion and kept in rotation by the pressure exerted upon their inner face by the ends of the blades 7 they do not permit the latter to exert upon the cylinder face a pressure which grows in the proportion the depth of the crescent-shaped working chamber increases.

In order to assure a faultless operation of said stay-rings by means of a good bearing contact and a liberal lubrication, said stay-rings are in accordance with Figures 1 and 3 kept in true concentric relation with the axis of the cylinder by the aid of three anti-friction bearings 10. These bearings are here represented as ball-bearings, but roller bearings would, of course, answer the same purpose. Each of these anti-friction bearings is mounted in one of the chamberlike lateral extensions 11 of the annular terminal cylinder recesses 8. The inner bearing ring 12 of each of these bearings is snugly seated upon a bolt 13 inserted through the inner opening 14 of the lateral extension 11 and after it has been pushed through the inner bearing ring 12 it is centrally supported by a bushing 15 seated in the outer opening 16 of said extension 11. Between the inner bearing ring 12 of the anti-friction bearing 10 and its outer contact ring 17 anti-friction balls 18 are arranged in the usual manner in ball-races 19 so that the contact ring 17 is bound to operate with a rolling motion not only on its external face in contact with the adjacent stay-ring 9, but also on its internal face in contact with the anti-friction balls 18.

The adjustment of the stay-rings 9 takes place when the engine has been brought up to its working-temperature after which said contact rings 17 are brought to press lightly against the peripheral surfaces of said stay-rings. The bolts 13 are then screwed up tightly to press the inner bearing ring 12 against the shoulder 20 of the extension 11 and thus hold said ring stationary. The bushing 15 is locked against rotation by means of the pins 21, whereas the inner opening 14 of the extension 11 is closed by a threaded plug 22, cover, or the like, so that the atmospheric air is effectively excluded from the terminal cylinder recess 8.

Stay-rings thus arranged concentrically with the axis of the cylinder and sustained without the least slip or play on the contact ring 17 do not require to bear with their narrow side faces air-tight against the cylinder covers 3 and against the facial shoulders 23 of the cylinder 2. On the contrary, said stay-rings are made of a width to permit them to rotate in said cylinder recesses 8 without lateral friction and thus admit small quantities of the motive fluid into said annular cylinder recesses and from thence into said extensions 11, so that for obvious reasons the mean pressure exerted by the motive fluid in the crescent-shaped working chamber 5 will also obtain in said annular cylinder recesses and in the lateral extensions 11. Since the lubricant is carried by the motive fluid and the latter has access to the annular terminal cylinder recesses 8 and their lateral extensions the lubricant is deposited therein and keeps the bearings and the stay-rings lubricated. To prevent the formation of too high a pressure, or an undue accumulation of motive fluid in said recesses and their lateral extensions, an adjustable safety valve 24 is provided for each terminal cylinder recess 8. Any accumulation of oil or of a condensate in the lowermost lateral extension 11 can be removed by the aid of a pet-cock 25. In case this latter extension is to be utilized as an oil reservoir oil may be introduced into it by means of the supply pipe 26.

The general operation of my improved rotary engine does not differ conspicuously from that of the known engines of this class, for which reason it is deemed sufficient to state that the motive fluid—compressed air, steam and the like—enters into the working chambers 5 through the grate-bottomed inlet-chamber 27, rotates the piston 4 in the direction indicated by the arrows in Figures 2 and 3, and escapes through the exhaust ports 28 into the exhaust channel 29. During the rotation of the piston the ends of the blades 7 are sustained by the revoluble stay-rings 9 within a circle equal to the circular cylinder bore, by which means the detrimental action of the blades 7 upon the cylinder face is effectively neutralized. While the blades 7 are driven outward during the first half of the rotation of the piston under the influence of the centrifugal force, they are during the second half of the rotation of the piston compulsorily returned to their starting point by the pressure exerted upon the outer edges of said blades by the inner face of said stay-rings.

It is evident that each stay-ring 9 may be sustained and guided by a greater number of anti-friction bearings than three. This increase in the number of bearings is, of course, accompanied by a corresponding increase in the number of points of contact and logically leads to the modifications illustrated in Figures 4 to 8 inclusive. In Figures 4 and 5 each of the stay-rings 9 acts as, and constitutes the inner bearing ring of an anti-friction bearing 30 of an inner diameter equal to that of the cylinder 2. In these bearings the anti-friction balls 31 sustain the stay-rings 9 with the same effect as the contact rings 17 do in Figures 1 to 3 inclusive. The external bearing rings 32 of these large antifriction bearings are rigidly held in place by the cylinder covers 3 which press these bearing rings against the facial cylinder shoulders 23 as indicated in Figure 4. The anti-friction balls 31 are guided on the stay-rings 9 in guide-channels 9' and on the stationary bearing-rings 32 in guide-channels 33 and are kept therein at the proper distance one from another by means of the cages 34, as more particularly indicated in Figure 5.

Figures 6 and 7 differ from Figures 4 and 5 inasmuch as the anti-friction balls of each of these anti-friction bearings 35 are arranged in two rows instead of one row as shown in Figure 4. These two rows are formed here by the anti-friction balls 36 contained in a massive cellular cage 37. This cage runs with but very little lateral play between the facial cylinder shoulder 23 and the adjacent cylinder cover 3 and with a similar radial play between the stay-ring 9 and the external bearing ring 38. The cage 37 is provided with two rows of radially arranged cells 39 for the reception of the anti-friction balls 36. The stay-rings 9 as well as the external bearing rings 38 of these anti-friction bearings are made without ball-races so that the balls 36 can move without let or hindrance on the smooth faces of these rings, and they may even execute movements parallel to the axis of the cylinder as far as this is made possible by the lateral play of the massive cage 37 between the cylinder cover 3 and the facial cylinder shoulder 23. These bearings 35 offer in comparison with the bearings 30 of Figures 4 and 5 the advantage of a more convenient insertion into, and removal from, the annular terminal cylinder recesses 8. It is advisable not to arrange the cells 39 in the cage 37 on the same transverse line but rather arrange them in a staggered or zigzag relation one to another as indicated in Figures 6 and 9.

I claim:—

1. A rotary engine comprising a cylinder provided with a central portion having annular recesses adjacent its ends and having ports for the intake and exhaust of motive fluid, a rotary piston eccentrically mounted in said cylinder and having radial slots, blades radially movable in said slots and adapted to frictionally slide over the inner surface of said central portion, stay rings rotatably mounted in said recesses, the inner diameter of said stay rings being the same as the inner diameter of said central portion, and anti-friction bearings between said rings and said cylinders, maintaining the rings in alignment with said central portion.

2. A rotary engine comprising a cylinder provided with a central portion having annular recesses adjacent its ends and having ports for the intake and exhaust of motive fluid, a rotary piston eccentrically mounted in said cylinder, blades radially movable in said piston and adapted to frictionally slide over the inner surface of said central portion, stay rings rotatably mounted in said recesses engaging the end portions of said blades and adapted to restrain the outward movement thereof, and anti-friction bearings arranged between said rings and said cylinder, maintaining said rings in concentric relation to said cylinder.

3. A rotary engine comprising a cylinder provided with a central portion having annular recesses of greater diameter than said central portion, and having ports for the intake and exhaust of motive fluid, a rotary piston eccentrically mounted in said cylinder, blades radially movable in said piston and adapted to frictionally slide over the inner surface of said central portion, stay rings rotatably mounted in said recesses engaging the end portions of said blades and adapted to restrain the outward movement thereof, and anti-friction bearing members in said recesses movable relative to the cylinder and to said rings, and maintaining said rings in concentric relation to said cylinder.

4. A rotary engine comprising a cylinder provided with a central portion having annular recesses at its ends, and having ports for the intake and exhaust of motive fluid, a rotary piston eccentrically mounted in said cylinder, blades radially movable in said piston and adapted to frictionally slide over the inner surface of said central portion, stay rings mounted in said recesses, engaging the outer portions of said blades and restraining the outward movement thereof, covers closing the ends of said cylinder and limiting the axial movement of said stay rings in said recesses, said recesses each being provided with at least three lateral extensions, and contact rings rotatably mounted in said extensions and engaging said stay rings to maintain them in concentric relation to said central portion.

5. A rotary engine comprising a cylinder provided with a central portion having annular recesses adjacent its ends and having ports for the intake and exhaust of motive fluid, a rotary piston eccentrically mounted in said cylinder, blades radially movable in said piston and adapted to frictionally slide over the inner surface of said central portion, stay rings mounted in said recesses, engaging the outer portion of said blades and restraining the outward movement thereof, said recesses each being provided with at least three lateral extensions, contact rings rotatably mounted in said extensions and engaging said stay rings to maintain them in concentric relation to said central portion, and anti-friction bearing means for said contact rings, said recesses being of greater width than said stay rings so as to allow the driving medium to penetrate to said anti-friction bearing means.

Signed by me at Cologne, Germany, this 9th day of January 1923.

ROBERT MEYER.